United States Patent
Soares et al.

(10) Patent No.: US 10,284,304 B2
(45) Date of Patent: May 7, 2019

(54) POLARIZATION INSENSITIVE SELF-HOMODYNE DETECTION RECEIVER FOR SPATIAL-DIVISION MULTIPLEXING SYSTEMS

(71) Applicant: NATIONAL INSTITUTE OF INFORMATION AND COMMUNICATIONS TECHNOLOGY, Koganei-shi, Tokyo (JP)

(72) Inventors: Luis Ruben Soares, Koganei (JP); Ben Puttnam, Kogenei (JP); Mendinueta Jose Manuel Delgado, Koganei (JP); Yoshinari Awaji, Koganei (JP); Naoya Wada, Koganei (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 0 days.

(21) Appl. No.: 15/565,419

(22) PCT Filed: Apr. 10, 2015

(86) PCT No.: PCT/JP2015/002028
§ 371 (c)(1),
(2) Date: Oct. 9, 2017

(87) PCT Pub. No.: WO2016/162904
PCT Pub. Date: Oct. 13, 2016

(65) Prior Publication Data
US 2018/0131447 A1 May 10, 2018

(51) Int. Cl.
*H04B 10/06* (2006.01)
*H04B 10/63* (2013.01)
(Continued)

(52) U.S. Cl.
CPC .......... *H04B 10/63* (2013.01); *H04B 10/614* (2013.01); *H04B 10/676* (2013.01); *H04J 14/04* (2013.01)

(58) Field of Classification Search
CPC ...... H04B 10/63; H04B 10/614; H04B 10/61; H04B 10/611; H04B 10/616; H04B 10/64; H04B 10/6151; H04B 10/676; H04J 14/04
(Continued)

(56) References Cited

U.S. PATENT DOCUMENTS 8,218,979 B2 * 7/2012 Liu ................. H04B 10/2513
 398/202
8,526,102 B2 * 9/2013 Inoue .................. H04B 10/60
 359/325
(Continued)

FOREIGN PATENT DOCUMENTS

JP WO2014034165 A1 3/2014

OTHER PUBLICATIONS

International Search Report of International Application No. PCT/JP2015/002028 completed May 15, 2015 and dated May 26, 2015 (2 pages).
Written Opinion of International Application No. PCT/JP2015/002028 completed May 15, 2015 (5 pages).
Benjamin J. Puttnam et al, Self-Homodyne Detection in Optical Communication Systems, Photonics, May 6, 2014, Photonics 2014 1(2), pp. 110-130 (Retrieval date May 13, 2015), Internet<URL:http://www.mdpi.com/2304-6732/1/2/110/pdf>.
(Continued)

*Primary Examiner* — Mohammad R Sedighian
(74) *Attorney, Agent, or Firm* — Pyprus Pte Ltd

(57) ABSTRACT

A SDH receiver which comprises a first polarization beam splitter 11, a second polarization beam splitter 13, a first separator 15, a second separator 17, a third separator 19, a fourth separator 21, a first 90-degree polarization rotor 23, a second 90-degree polarization rotor 25, a first hybrid detector 31, a second hybrid detector 33, a third hybrid detector 35, a fourth hybrid detector 37, and a signal processor 39.

4 Claims, 4 Drawing Sheets

(51) Int. Cl.
    *H04J 14/04*     (2006.01)
    *H04B 10/67*     (2013.01)
    *H04B 10/61*     (2013.01)

(58) Field of Classification Search
    USPC .................................... 398/203, 205, 207
    See application file for complete search history.

(56) References Cited

U.S. PATENT DOCUMENTS

| | | |
|---|---|---|
| 9,819,420 B2 * | 11/2017 | Wen .................... H04B 10/532 |
| 2007/0025737 A1 | 2/2007 | Kamio |
| 2014/0270769 A1 | 9/2014 | Nazarathy et al. |
| 2014/0286651 A1 * | 9/2014 | Takechi ............... H04B 10/614 |
| | | 398/208 |
| 2015/0139667 A1 * | 5/2015 | Takeuchi ............. H04B 10/614 |
| | | 398/214 |

OTHER PUBLICATIONS

Ruben S. Luis et al., Demonstration of Wavelength-Shared Coherent PON Using RSOA and Simplified DSP, IEEE Photonics Technology Letters, vol. 26, No. 21, IEEE, Nov. 1, 2014, pp. 2142-2145.

Pontus Johannisson et al., Cancellation of Nonlinear Phase Distortion in Self-Homodyne Coherent Systems, IEEE Photonics Technology Letters, Jun. 1, 2010, vol. 22, No. 11, pp. 802-804.

Koichi Murata et al., 100-Gbit/s PDM-QPSK Integrated Coherent Receiver Front-End for Optical Communications, Compound Semiconductor Integrated Circuit Symposium (CSICS), Oct. 16, 2011, pp. 1-4.

Leonid G. Kazovsky. et al., "Phase- and Polarization-Diversity Coherent Optical Techniques", Feb. 2, 2017.

\* cited by examiner

[Fig. 1]
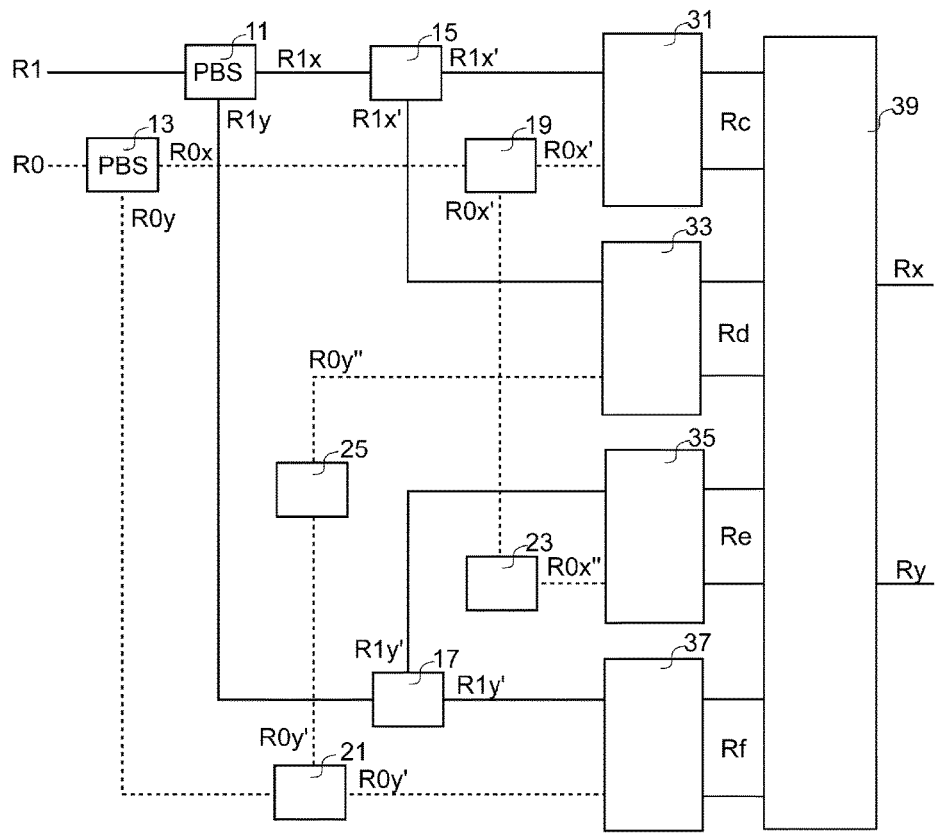
[Fig. 2]
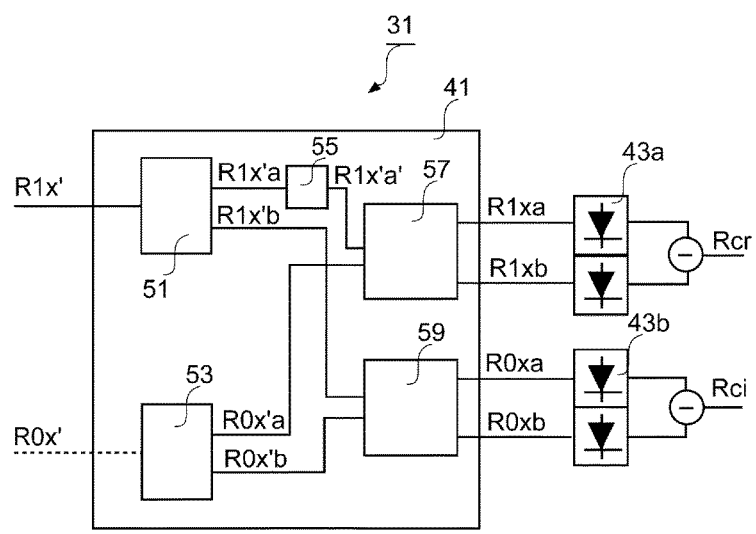

[Fig. 3]
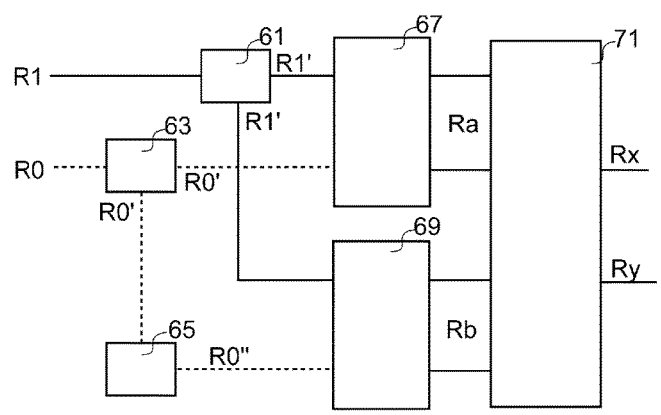
[Fig. 4]
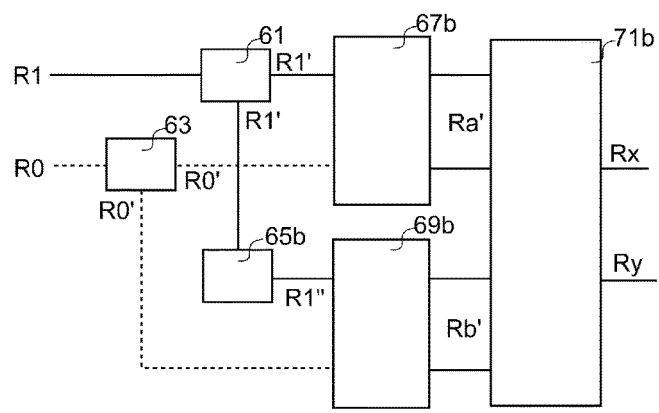

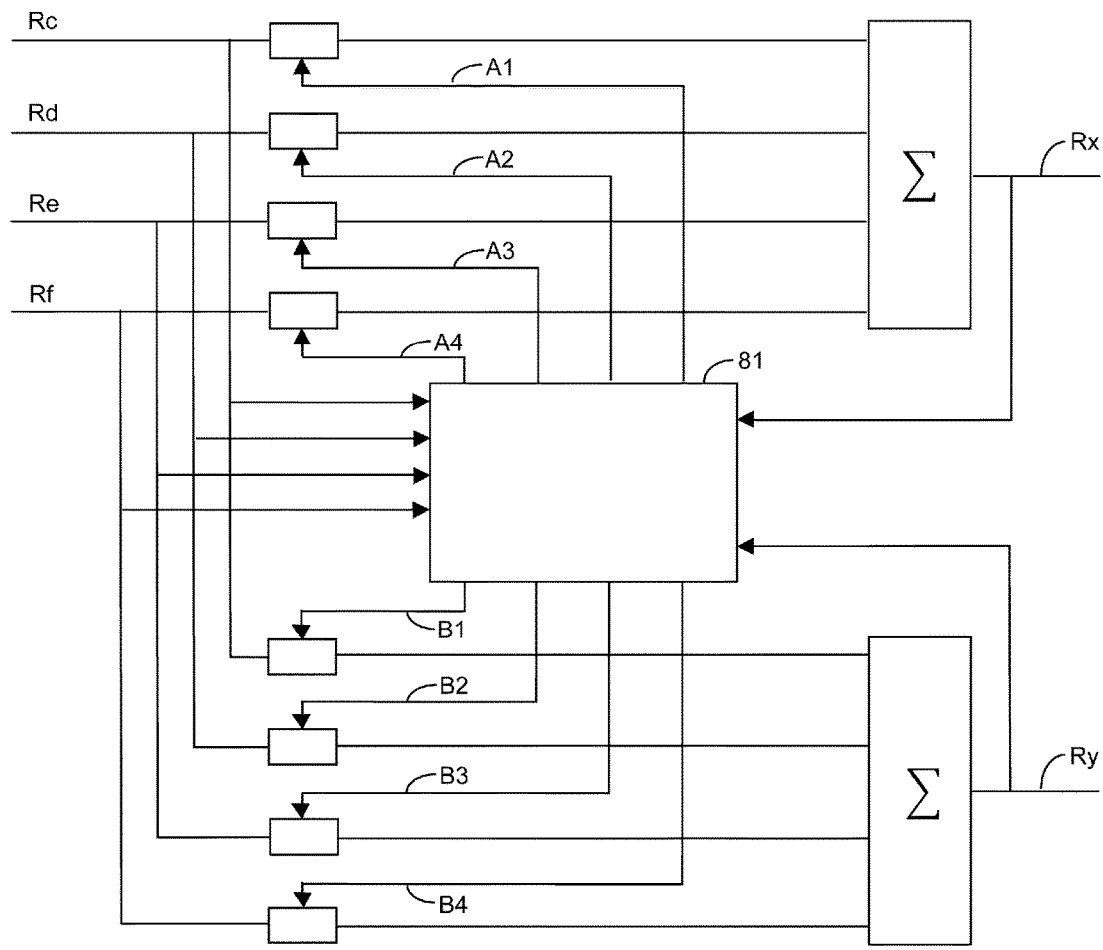
[Fig. 5]

[Fig. 6]
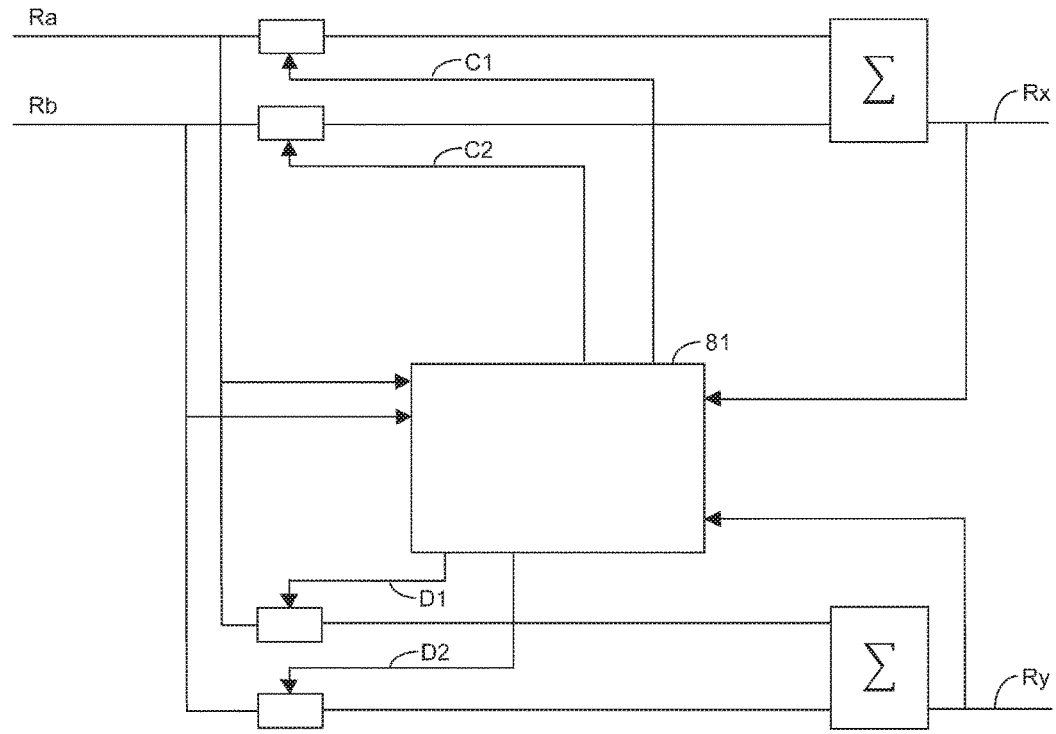
[Fig. 7]
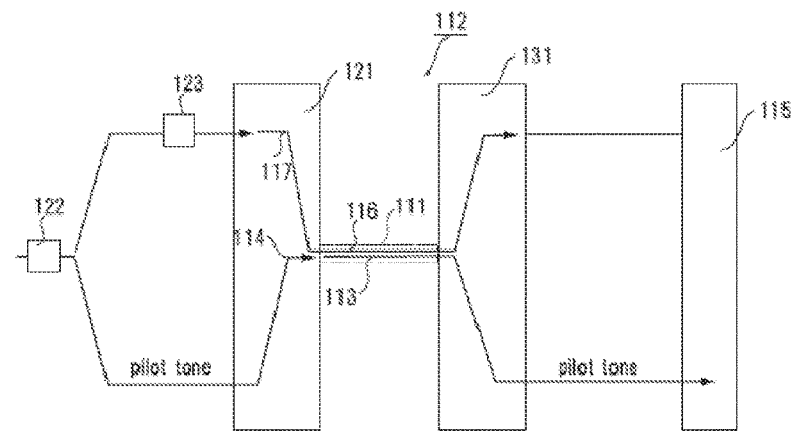
[Fig. 8]
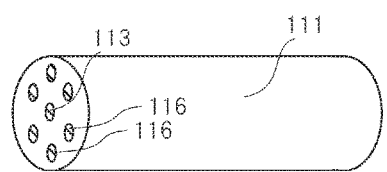

US 10,284,304 B2

POLARIZATION INSENSITIVE SELF-HOMODYNE DETECTION RECEIVER FOR SPATIAL-DIVISION MULTIPLEXING SYSTEMS

TECHNICAL FIELD

The present invention relates to a receiver for Coherent self-homodyne detection (SHD) and more particularly to polarization insensitive SDH receiver.

BACKGROUND ART

Coherent self-homodyne detection (SHD) in spatial division multiplexing (SDM) systems is based on transmitting a pilot tone (PT) in one spatial channel and distinct signals on the remaining spatial channels. SHD requires that the PT and signals originate from the same light source and are phase coherent. After transmission through a spatial division multiplexing media, the signals are received using coherent homodyne detection with the PT as local oscillator (LO). As the signals and PT are phase coherent at the receiver input, the impact of laser phase noise from the original light source in the detected signal after optical-to-electrical conversion is cancelled. As a consequence, SHD allows the use of low-cost wide-linewidth lasers, it does not require carrier frequency offset estimation or compensation and requires only residual phase noise compensation. In the case of digital receivers, this greatly simplifies the required digital signal processing, lowering cost and energy consumption of the receiver. In addition, SHD does not require the use of a potentially costly laser to be used as local oscillator at the receiver. SHD may be used in any form of existing spatial division multiplexing media, such as multi-core fibers, multi-mode fibers, hybrid multi-mode and multi-core fibers, independent fibers or multi-element fibers.

CITATION LIST

Patent Literature

[PTL1] WO 2014034165 pamphlet

Non Patent Literature

[NPL1] Kazovsky, "Phase- and Polarization-Diversity Coherent Optical Techniques," J. Lightwave Technol., vol. LT-7, no. 2, pp. 279-292, February 1989

SUMMARY OF INVENTION

Technical Problem

SHD relies on mixing the PT with the signal at a polarization and phase diversity receiver. The conventional approach for such receiver is similar to the receivers used in intradyne detection systems [e.g., Kazovsky, "Phase- and Polarization-Diversity Coherent Optical Techniques," J. Lightwave Technol., vol. LT-7, no. 2, pp. 279-292, February 1989] and is based on first splitting the incoming signal in two orthogonal polarization components using a polarization beam splitter. Each component is independently detected after mixing it with a LO in phase-diversity receivers. The polarization state of the LO is aligned in a way that it can be mixed equally with the orthogonal polarization components of the signal. However, in a SHD receiver, the PT replaces the LO and has an unknown and randomly varying state of polarization. This is a result of transmission through the spatial division multiplexing system as well as fluctuations of the environmental conditions affecting optical systems along the transmission path. As such, conventional SHD receiver must include mechanisms to align the state of polarization of the PT to the polarization axis of the receiver so as to enable the detection of the signal. To perform this, potentially costly optical polarization tracking and alignment mechanisms are required to align the state of polarization of the PT.

Solution to Problem

This invention regards two means of solving the aforementioned problem. In one approach, orthogonal polarization components of both the signal and pilot tone are separated and recombined independently with appropriate weights or coefficients in a way that polarization misalignment of the pilot tone can be corrected via signal processing.

In another approach, this invention proposes to use a receiver without polarization restricting components, such as polarization beam splitters. This receiver uses the pilot tone itself as a polarization reference against the received signal. This is equivalent to observing the signal on a moving frame of reference aligned with the incoming pilot tone. Therefore, the signal can be reconstructed using signal processing, regardless of the state of polarization of the pilot tone.

For the purpose of this description, consider the arrival at the receiver of two optical signals. An un-modulated signal R0, corresponding to the pilot tone, and a modulated signal R1, which carries two information signals on its orthogonal polarization components. Both signals R0 and R1 originate from the same light source at the transmitter side of a spatial division multiplexing transmission system.

The receiver separates the signal R1 in two orthogonal polarization components R1$x$ and R1$y$ by a polarization beam splitter. The pilot tone R0 is also separated into two orthogonal polarization components R0$x$ and R0$y$ by a polarization beam splitter. The components R1$x$ and R0$x$ are co-polarized and therefore can be mixed directly in a 90-degree hybrid. The resulting interference signals are detected by two pairs of balanced photodetectors, generating electrical signals corresponding to the real and imaginary parts of the interference signal Rc. Similarly, the components R1$y$ and R0$y$ are co-polarized and may be mixed in another 90-degree hybrid. The corresponding interference signal is detected by the two pairs of balanced photodetectors to generate the electrical signals corresponding to the real and imaginary parts of the interference signal Rf.

The component R1$x$ is also mixed with the component R0$y$ at a 90-degree hybrid. To enable this mix, a 90-degree polarization rotator is used to align R0$y$ to the same polarization as R0$x$. A pair of balanced photodetectors converts the converts the resulting interference signal to electrical signals Rd. Finally, the component R1$y$ is mixed with the component R0$x$ at a 90-degree hybrid, after the polarization of R0$x$ is aligned with R1$y$ using a 90-degree polarization rotator. A pair of balanced photodetectors converts the converts the resulting interference signal to the electrical signals Re. The real and imaginary component of the four complex electrical signals Rc, Rd, Re, and Rf are sent to a signal processor, which reconstructs the complex signals Rx and Ry. These correspond to the information signals initially used to generate R1.

The second embodiment for a self-homodyne detection polarization and phase-diversity coherent receiver insensitive to variations of the polarization state of the pilot tone. In this case, the signal R1 is sent to two 90-degree hybrids, to be mixed with the pilot tone R0 and an orthogonal version of R0, respectively. The polarization of the later has been modified using a 90-degree polarization rotator. Note that this embodiment of the receiver has no components that would limit or restrict the polarization components of the signal R1 or pilot tone R0. Instead, it relies on using the 90-degree hybrids to detect the projections of the signal R1 over the polarization axis of the pilot tone R0 and its orthogonal direction. These polarization directions may vary freely without disrupting the function of the receiver. The interference signals generated in the 90-degree hybrids are converted into the complex signals Ra and Rb by the two pairs of balanced photodetectors. The two electrical signals are sent to a signal processor, which reconstructs the signals Rx and Ry, corresponding to the information signals initially used to generate R1.

Advantageous Effect of Invention

To address the aforementioned limitations of the prior art, this invention provides in one aspect two embodiments for self-homodyne detection polarization and phase-diversity coherent receivers that are insensitive to variations of the polarization state of the pilot tone. In another aspect, this invention provides signal-processing structures, which may be used along with the aforementioned receivers to reconstruct the original information signals regardless of the polarization state of the pilot tone.

BRIEF DESCRIPTION OF DRAWINGS

FIG. 1 depicts a block diagram of the SDH receiver of the first embodiment.

FIG. 2 depicts the block diagram of the first hybrid detector.

FIG. 3 depicts a block diagram of SHD receiver of the second embodiment.

FIG. 4 depicts a block diagram of SHD receiver of the third embodiment.

FIG. 5 depicts a block diagram of a signal processor used in the SHD receiver of the first embodiment.

FIG. 6 depicts a block diagram of a signal processor used in the SHD receiver of the second and third embodiments.

FIG. 7 depicts a block diagram illustrating a space-division multiplexing apparatus.

FIG. 8 is a conceptual diagram illustrating the multi-core fiber.

DESCRIPTION OF EMBODIMENTS

The first aspect of invention relates to a self-homodyne detection (SHD) receiver. FIG. 1 depicts a block diagram of the SDH receiver. As shown in the FIG. 1, the SDH receiver of the first embodiment comprises a first polarization beam splitter 11, a second polarization beam splitter 13, a first separator 15, a second separator 17, a third separator 19, a fourth separator 21, a first 90-degree polarization rotator 23, a second 90-degree polarization rotator 25, a first hybrid detector 31, a second hybrid detector 33, a third hybrid detector 35, a fourth hybrid detector 37, and a signal processor 39.

The first polarization beam splitter 11 separates an input signal R1 in two orthogonal polarization components of the input signal R1x, R1y. A polarization beam splitter, PBS, is well known optical element and therefore it is possible to use PBS to the first polarization beam splitter 11. The polarized plane of R1x is perpendicular to that of R1y.

The second polarization beam splitter 13 separates a pilot tone R0 in two orthogonal polarization components of the pilot tone R0x and R0y. The polarization plane of R0x is perpendicular to that of R0y. The polarized plane of R1x and that of R0x are parallel.

The first separator 15 separates one of the orthogonal polarization components of the input signal R1x in two components R1x'. The one of the orthogonal polarization components of the input signal R1x is output from the first polarization beam splitter 11. The first separator 15 separates the signal R1x into two intensity separated components R1x'.

The second separator 17 separates another orthogonal polarization component of the input signal R1y in two components R1y'. The orthogonal polarization component of the input signal R1y is output from the first polarization beam splitter 11.

The third separator 19 separates one of the orthogonal polarization components of the pilot tone R0x in two components R0x'.

The fourth separator 21 separates another orthogonal polarization component of the pilot tone R0y in two components R0y'.

The first 90-degree polarization rotator 23 aligns polarization of R0x' with that of R1y' to obtain aligned component R0x''. A 90-degree polarization rotator rotates polarized plane by 90 degrees. The input signal R0x' is output from the separator 19. The polarized plane of the R0x' is rotated by 90 degrees to align that of R1y'.

The second 90-degree polarization rotator 25 aligns polarization of R0y' with that of R1x' to obtain aligned component R0y''.

The first hybrid detector 31 couples the components R1x' and R0x' and outputs electric signals that correspond to real and imaginary parts of Rc. The Rc is an interference signal of the components R1x' and R0x'. The hybrid detector is well known in the art and there are various types of hybrid detectors. It is possible to implement various types of hybrid detectors. For example, US 20090214224 and U.S. Pat. No. 7,421,210 disclose such hybrid detectors.

FIG. 2 depicts the block diagram of the first hybrid detector. As shown in the FIG. 2, the first hybrid detector may comprise a 90-degree hybrid 41, a first set of two photodetectors 43a in a balanced configuration and a second set of two photodetectors 43b in a balanced configuration.

The 90-degree hybrid 41 comprises a first splitter 51, a second splitter 53, a 90 degree phase shifter 55, a first 2×2 coupler 57, and a second 2×2 coupler 59.

The first splitter 51 divides R1x' into two components R1x'a and R1x'b.

The second splitter 53 divides R0x' into two components R0x'a and R0x'b.

The 90 degree phase shifter 55 shifts a phase of R1x'a by 90 degrees to obtain a phase shifted signal R1x'a'.

The first 2×2 coupler 57 combines the signal R0x'a and the phase shifted signal R1x'a' to generate optical signals R1xa and R1xb. The optical signals R1xa and R1xb are proportional to jR0x'a+j R1x'a' and −R0x'a+R1x'a', respectively.

The second 2×2 coupler 59 combines the signal R1x'b and the signal R0x'b to generate optical signals R0xa and R0xb. The optical signals R0xa and R0xb are proportional to j R1x'b−R0x'b and −R1x'b+j R0x'b, respectively.

The first set of two photodetectors 43a detects the electrical signals R1xa and R1xb and outputs a first electrical signal Rcr. The Rcr is a real part of the Rc. The first electrical signal Rcr results from the difference between the instantaneous powers of the optical signals R1xa and R1xb and is proportional to the real part of $R1x'a' \times R0x'a^*(=(R1x'a')(R0x'a^*))$. The $R0x'a^*$ means the complex number of $R0x'a$.

The second set of two photodetectors 43b detects the signals R0xa and R0xb and outputs a second electrical signal Rci. The second electrical signal Rci results from the difference between the instantaneous powers of the optical signals R0xa and R0xb and is proportional to the imaginary part of $R1x'b \times R0x'b^*(=(R1x'b)(R0x'b^*))$. The Rci is an imaginary part of Rc.

The second hybrid detector 33 couples the components $R1x'$ and $R0y'''$ and outputs electric signals that correspond to real and imaginary parts of Rd. The Rd is an interference signal of the components $R1x'$ and $R0y'''$. The second hybrid detector 33 may be similar to the first hybrid detector 31.

The third hybrid detector 35 couples the components $R1y'$ and $R0x'$ and outputs electric signals that correspond to real and imaginary parts of Re. The Re is an interference signal of the components $R1y'$ and $R0x'''$. The third hybrid detector 35 may be similar to the first hybrid detector 31.

The fourth hybrid detector 37 couples the components $R1y'$ and $R0y'$ and outputs electric signals that correspond to real and imaginary parts of Rf. The Rf is an interference signal of the components $R1y'$ and $R0y'$. The fourth hybrid detector 37 may be similar to the first hybrid detector 31.

The signal processor 39 receives the real and imaginary parts of Rc, Rd, Re and Rf and reconstructs complex signals Rx and Ry. The Rx and Ry correspond to an information signal used to generate the input signal R1.

The second embodiment of the invention also relates to a self-homodyne detection (SHD) receiver. FIG. 3 depicts a block diagram of SHD receiver. As shown in the FIG. 3, the SHD receiver comprises a sixth separator 61, a seventh separator 63, a third 90-degree polarization rotor 65, a fifth hybrid detector 67, a sixth hybrid detector 69 and a signal processor 71.

The sixth separator 61 separates an input signal R1 in two components R1'.

The seventh separator 63 separates a pilot tone R0 in two components R0'.

The third 90-degree polarization rotor 65 modifies polarization of the component R0' by 90 degrees to obtain aligned component R0''. Namely, the third 90-degree polarization rotor 65 rotates the polarized plane of the component R0' by 90 degrees.

The fifth hybrid detector 67 couples the components R1' and R0' and outputs electric signals that correspond to real and imaginary parts of Ra. The Ra is an interference signal of the components R1' and R0'.

The sixth hybrid detector 69 couples the components R1' and R0'' and outputs electric signals that correspond to real and imaginary parts of Rb. The Rb is an interference signal of the components R1' and R0''.

The signal processor 71 receives the real and imaginary parts of Ra and Rb and reconstructs complex signals Rx and Ry. The Rx and Ry correspond to an information signal used to generate the input signal R1.

The third embodiment of the invention also relates to a self-homodyne detection (SHD) receiver. FIG. 4 depicts a block diagram of SHD receiver.

The SHD receiver in FIG. 4 is similar to that depicted in FIG. 3. The SHD receiver of the third embodiment comprises a sixth separator 61, a seventh separator 63, a fourth 90-degree polarization rotor 65b, a seventh hybrid detector 67b, an eighth hybrid detector 69b, and a signal processor 71b.

The sixth separator 61 separates an input signal R1 in two components R1'.

The seventh separator 63 separates a pilot tone R0 in two components R0'.

The fourth 90-degree polarization rotor 65b modifies polarization of the component R1' by 90 degrees to obtain aligned component R1''.

The seventh hybrid detector 67b couples the components R1' and R0' and outputs electric signals that correspond to real and imaginary parts of Ra'. The Ra' is an interference signal of the components R1' and R0'.

The eighth hybrid detector 69b that couples the components R1'' and R0' and outputs electric signals that correspond to real and imaginary parts of Rb', the Rb' being an interference signal of the components R1'' and R0'.

The signal processor 71b receives the real and imaginary parts of Ra' and Rb' and reconstructs complex signals Rx and Ry. The Rx and Ry correspond to an information signal used to generate the input signal R1.

The second aspect of this invention consists of embodiments of the methods used to reconstruct the original signals, using the signal processors.

FIG. 5 depicts a block diagram of a signal processor used in the SHD receiver of the first embodiment. FIG. 6 depicts a block diagram of a signal processor used in the SHD receiver of the second and third embodiments. Both signal processors comprises a plurality of multiplexer and adder and a processing unit 81. The signal processor may be implemented by hardware or combination of hardware and software.

In the case of the processor used in the first embodiment, the complex signals Rc, Rd, Re, and Rf are provided to the signal processor as inputs. It can be shown that the original information signals can be reconstructed as a linear combination of the input signals as:

$$Rx = A1 \times Rc + A2 \times Rd + A3 \times Re + A4 \times Rf$$

$$Ry = B1 \times Rc + B2 \times Rd + B3 \times Re + B4 \times Rf \qquad (1)$$

where the complex coefficients A1 . . . A4 and B1 . . . B4 can be computed using feedforward and/or feed back information regarding the transfer matrixes of the spatial channels used to transmit R0 and R1. A processing unit takes as inputs the signals Rc, Rd, Re and Rf and/or the outputs Rx and Ry to compute the coefficients A1 . . . A4 and B1 . . . B4. In its simplest form, theses coefficients are slow varying complex scalars, in which case the application is performed by simple multiplication. However, more complex processors may take into account the impulse response of the spatial channels of the signal and pilot tone. In such cases, the coefficients become the impulse response of filters to be applied to the input signals and reconstruct the output signals.

The embodiment for the method used by the signal processor used in the second or third embodiment takes into account that the signals Ra and Rb correspond to projections of the signal onto the polarization axis of the pilot tone and its orthogonal polarization axis, respectively. As such, the information signals can be reconstructed through a linear combination of Ra and Rb as:

$$Rx = C1 \times Ra + C2 \times Rb$$

$$Ry = D1 \times Ra + D2 \times Rb \qquad (2)$$

Where C1, C2, D1 and D2 are the complex coefficients of linear combination. Similarly to the previous case. In this case, the coefficients are related with the combined channel matrix that results from the projection of the channel matrix of the spatial channel used to transmit the signal R1 onto the channel matrix used to transmit the pilot tone R0. They can be estimated using feedback or feedforward mechanisms implemented in the processing unit. These coefficients may be slow varying complex scalars, in which case the application is performed by simple multiplication. However, more complex processors may take into account the impulse response of the spatial channels of the signal and pilot tone. In such cases, the coefficients become the impulse response of filters to be applied to the input signals and reconstruct the output signals.

FIG. 7 depicts a block diagram illustrating a space-division multiplexing apparatus. The space-division multiplexing apparatus 112 comprises a multi-core fiber 111 having multiple cores. The space-division multiplexing apparatus 112 uses cores other than a specific core 113 for self-homodyne detection among the cores included in the multi-core fiber 111 as cores 116 carrying optical data signals. The SHD receiver is used as self-homodyne detection unit 115 in FIG. 7.

FIG. 8 is a conceptual diagram illustrating the multi-core fiber. The multi-core fiber 111 is an optical fiber having two or more cores. As an example of the multi-core fiber, there is a multi-core fiber having a center core and one or a plurality of cores existing around the center core or a rectangular core fiber having two or more rectangular cores. In the multi-core fiber 111, a core may not necessarily exist at the center. For example, a multi-core fiber where 2 to 4 (or more) cores are symmetrically arranged may be employed. Each core has a function as a waveguide in the multi-core fiber. Adjacent waveguides exist in a distance of, for example, 1 or more micrometers to 100 or less micrometers. The interval of the waveguides may be 3 or more micrometers to 70 or less micrometers, may be 5 or more micrometers to 70 or less micrometers, may be 10 or more micrometers to 60 micrometers, may be 20 or more micrometers to 50 micrometers, or may be 30 or more micrometers to 40 or less micrometers. The distance between the adjacent waveguides denotes a distance of a portion (for example, a clad portion) where no additional cores exist.

In the example of the multi-core fiber 111, the multi-core fiber includes the center core and the plurality of cores existing around the center core. In this case, for example, the center core may be used as a core 113 for self-homodyne detection. Moreover, in the case of considering convenience of manufacturing or the like or in the case of selectively using varied cores, the core 113 for self-homodyne detection may not be the center core of the multi-core fiber 111.

A diameter $phi_s$ of the core 113 for self-homodyne detection and a diameter $phi_c$ of the cores 116 for communication may have a relationship of $0.5 \leq phi_s/phi_c \leq 3$. A preferred example of the relationship between the diameter $phi_s$ of the core 113 for self-homodyne detection and the diameter $phi_c$ of the cores 116 for communication is $1.01 \leq phi_s/phi_c \leq 1.15$, may be $1.1 \leq phi_s/phi_c \leq 1.3$, may be $1.2 \leq phi_s/phi_c \leq 3$, and may be $2 \leq phi_s/phi_c \leq 3$. An optical frequency comb light beam including multiple optical spectra may be generated by using a reference light beam including one or multiple (for example, 2 or more to 10 or less, 2 or more to 6 or less, 3 or more to 6 or less, or 3 or more or 5 or less) optical spectra (frequency components) through non-linearity in the fiber. This optical frequency comb light beam may be used as a reference light beam for demodulating each channel of wavelength-division multiplexing (WDM) in the receiver side. Particularly, in the case where the present invention is used for this application, it is preferable that the core 113 for self-homodyne detection is smaller than the cores 116 for communication. In this case, in the preferred examples, the relationship between the diameter $phi_s$ of the core 113 for self-homodyne detection and the diameter $phi_c$ of the cores 116 for communication may be $0.7 \leq phi_s/phi_c \leq 0.99$, may be $0.7 \leq phi_s/phi_c \leq 0.95$, and may be $0.95 \leq phi_s/phi_c \leq 0.99$. The optimal core diameters may be designed in consideration of the conditions such as an input light beam, a fiber length, a dispersion characteristic of fiber, and the number of spectra required.

The light beam output from a light source 122 is appropriately demultiplexed. At least one of the demultiplexed light beams is used as a pilot tone (pilot signal), for example, for self-homodyne detection. The pilot tone or the pilot signal is a signal which is used as a reference of phase in the homodyne detection period. A well-known light source may be used as the light source 122. As an example of the light source 122, there is a light source including an optical frequency comb generator. By using the optical frequency comb generator, it is possible to easily generate a multiple-wavelength signal. The pilot tone may be appropriately delayed by a delay unit (for example, a delay circuit).

An optical signal for communication may be appropriately modulated by a modulator 123. As an example of the modulator 123, there is a phase modulator. A plurality of the signals for communication may be guided to the respective cores by a signal guiding unit 117. Each light beam generated by the light source 122 may be appropriately modulated.

As an example of a multiplexing unit 121, there is a space-division multiplexing unit (SDM MUX). The space-division multiplexed optical signal 111 denotes an optical signal when multiple paths or multiple types of optical signals exist in a space which becomes a transmission line. Examples of the space-division multiplexed optical communication are disclosed in JP 10-336152 A and JP 2009-284385 A.

An example of the space-division multiplexed optical signal 111 is any one of an optical signal in a Gaussian mode, an optical signal in a Laguerre-Gaussian mode, a Bessel beam optical signal, an optical signal in a Hermite-Gaussian mode, or an optical signal in an Airy mode. Components such as optical elements constituting a switching device may be appropriately adjusted. For example, in the case where the optical signal of the Gaussian mode is output from a mode converter 113, the optical signal is irradiated to a first waveguide 117. Then, for example, in the case where the optical signal of the Laguerre-Gaussian mode (the Bessel beam optical signal, the optical signal of the Hermite-Gaussian mode, or the optical signal of the Airy mode may be used) is output from the mode converter 113, the optical signal is irradiated to a second waveguide 118. The optical signal of the mode is disclosed in, for example, JP 4871326 and JP 2003-139514 A. Next, the mode of the space-division multiplexed optical signal is appropriately converted by mode conversion described later.

The optical signal of the Laguerre-Gaussian mode which is a space-division multiplexed optical signal is light of the mode with a ring shape intensity distribution which is concentric from the central axis of the beam propagation. In addition, the Gaussian mode is a mode having the maximum intensity in the central axis of the beam propagation. In the present invention, with respect to the optical signal of the Laguerre-Gaussian mode, a theoretical optical signal having a completely ring-shaped intensity distribution and an optical signal having a ring-shaped intensity distribution to the extent that may be determined to be the optical signal of the Laguerre-Gaussian mode are included in the optical signal of the Laguerre-Gaussian mode. This analysis is similarly applied to the other modes. The present invention may include a space-division multiplexed optical signal generation device for generating the space-division multiplexed optical signal and may be a device using the space-division multiplexed optical signal generated by the space-division multiplexed optical signal generation device. As an example of the space-division multiplexed optical signal device, a device including the Laguerre-Gaussian mode optical signal generation device for generating the optical signal of the Laguerre-Gaussian mode and a device including the Hermite-Gaussian mode optical signal generation device for generating the optical signal of the Hermite-Gaussian mode, may be employed.

The Bessel beam optical signal denotes a light beam having an electric field distribution of a Bessel function type in the radial axis. The Bessel beam optical signal propagates at a substantially constant beam diameter without causing diffraction. As an example of the space-division multiplexed optical signal device, a device including a Bessel beam optical signal generation device for generating the Bessel beam optical signal may be employed. The optical signal of the Airy mode is an optical signal of which intensity distribution is related to the Airy distribution. An apparatus for outputting an Airy-ring-shaped optical signal is well known.

In the multiplexing unit 121, a pilot tone for self-homodyne detection is guided to the core 113 for self-homodyne detection which is any one of the multiple cores. An optical system of the multiplexing unit 121 has a function as, for example, a pilot-tone guiding unit 114.

In the above-described preferred aspect, the space-division multiplexing apparatus is configured to further include a multiplexing unit 121 and a signal guiding unit 117. The multiplexing unit 121 is a component for multiplexing the data signals for communication and the pilot tone. The signal guiding unit 117 is a component for guiding the data signals for communication among the signals multiplexed by the multiplexing unit 121 to the cores 116 for communication. The optical system of the multiplexing unit 121 has a function as, for example, the signal guiding unit 117.

The signal propagating through the multi-core fiber 111 is separated, for example, by a separation unit 131. An example of the separation unit 131 is a space-division demultiplexing unit (SDM DE-MUX). In the separation unit 131, the pilot tone is guided to an optical path for the pilot tone. Next, the pilot tone reaches a self-homodyne detection unit 115. On the other hand, the data signal for communication is also separated by the separation unit 131. The data signal for communication is guided to the optical path for communication in the separation unit 131. Next, the data signal for communication reaches the self-homodyne detection unit 115.

The self-homodyne detection unit 115 is a component for detecting the pilot tone output from the core 113 for self-homodyne detection and performing the self-homodyne detection. Namely, the self-homodyne detection unit 115 demodulates the data signal for communication by using the pilot tone as a reference signal. The homodyne detection is a detection technique according to a phase modulation method, in which a signal is extracted by using interference when the frequency of the optical carrier wave and the frequency of a locally oscillating light beam are equal to each other. The self-homodyne detection technique using the pilot tone is well-known (for example, Institute of Electronics and Communication Engineers of Japan, Technical Report. CS, Communication Method 107 (91), 17-22, 2007-06-08)).

It is preferable that the space-division multiplexing apparatus 112 according to the present invention accurately controls the optical path length of each core of the multi-core fiber (therefore, the optical path length difference between the cores). Therefore, the embodiment where a transmission-side apparatus or a receiver-side apparatus is configured to include an optical path length adjustment unit which adjusts the optical path length of each core of the multi-core fiber is a preferred embodiment of the present invention. The optical path length adjustment unit is installed, for example, in a connection device of the multi-core fiber and other optical components. As specific values of the optical path length difference, according to performance of a laser in use, the optical path length difference of each core is set to, for example, 10 meters or less, preferably, 1 meter or less, preferably, 30 centimeters or less, more preferably, 3 centimeters or less. The optical path length difference of each core denotes a difference between the longest optical path length and the shortest optical path length among the multiple cores. For example, the optical path adjustment unit may measure the optical path length difference of each core of the multi-core fiber in advance, and the optical path length adjustment unit may adjust the optical path length of each core in accordance with the performance of the laser. An example of the optical path length adjustment unit is an optical delay circuit or an optical fiber.

In order to realize stable operations, it is preferable that the space-division multiplexing apparatus 112 according to the present invention monitors the optical path length difference of each core and controls the optical path length of each core which is adjusted by the optical path length adjustment unit based on the obtained information on the optical path length difference. An automatic adjustment mechanism for the optical path length difference may include, for example, an optical path difference measurement unit which measures the optical path length difference of each core, a control unit which receives the optical path length difference of each core measured by the optical path length measurement unit, and an optical path length adjustment unit which adjusts the optical path length difference of each core in response to a command from the control unit.

A self-homodyne detection method using a space-division multiplexing apparatus 112 including a multi-core fiber 111 having multiple cores is explained hereafter. An example of the space-division multiplexing apparatus 112 is one of the space-division multiplexing apparatuses 112 described above.

In the method, a light beam from a light source 122 is demultiplexed. Next, a pilot tone for self-homodyne detection is guided to a core 113 for self-homodyne detection which is any one of the multiple cores. On the other hand, the demultiplexed light beams are multiplexed, and a modulation signal is carried on the light beams. The pilot tone and the multiplexed signal are introduced into the multi-core fiber. Next, the pilot tone and the space-division multiplexed signals are separated, and each signal is guided to the self-homodyne detection unit 115. The self-homodyne detection unit 115 detects the pilot tone output from the core 113 for self-homodyne detection and performs the self-homodyne detection by using the pilot tone as a reference signal. In this example, the receiver side or the transmitter side generates an optical frequency comb light beam from the reference light beam for self-homodyne detection. Next, each optical frequency comb signal is used as the reference light beam for demodulating each channel of WDM signal. Since an optical frequency comb signal generation device is already known, a well-known optical frequency comb signal generation device may be used in order to obtain the optical frequency comb light beam using the reference light beam. An example of the optical frequency comb signal generation device is disclosed in JP 3937233, JP 4423372, JP 4771216, JP 3444958, or JP 2011-221366 A. An example of the optical frequency comb generator is an optical frequency comb generator configured to include an optical fiber loop. The optical fiber loop is configured to include an optical single-sideband (SSB) modulator, an optical input port through which the light from the light source is input, and an optical output port which outputs the light. In the optical frequency comb signal, each frequency is shifted. Therefore, each optical frequency comb signal can be used as the reference light beam for demodulating the channel of the corresponding WDM.

The invention claimed is:

1. A self-homodyne detection (SHD) receiver comprising:
a first polarization beam splitter (11) which separates an input signal R1 in two orthogonal polarization components of the input signal R1$x$, R1$y$;
a second polarization beam splitter (13) which separates a pilot tone R0 in two orthogonal polarization components of the pilot tone R0$x$ and R0$y$;
a first separator (15) which separates one of the orthogonal polarization components of the input signal R1$x$ in two components R1$x'$;
a second separator (17) which separates another orthogonal polarization component of the input signal R1$y$ in two components R1$y'$;
a third separator (19) which separates one of the orthogonal polarization components of the pilot tone R0$x$ in two components R0$x'$;
a fourth separator (21) which separates another orthogonal polarization component of the pilot tone R0$y$ in two components R0$y'$;
a first 90-degree polarization rotator (23) which aligns polarization of R0$x'$ with that of R1$y'$ to obtain aligned component R0$x''$;
a second 90-degree polarization rotator (25) which aligns polarization of R0$y'$ with that of R1$x'$ to obtain aligned component R0$y''$;
a first hybrid detector (31) that couples the components R1$x'$ and R0$x'$ and outputs electric signals that correspond to real and imaginary parts of Rc, the Rc being an interference signal of the components R1$x'$ and R0$x'$;
a second hybrid detector (33) that couples the components R1$x'$ and R0$y''$ and outputs electric signals that correspond to real and imaginary parts of Rd, the Rd being an interference signal of the components R1$x'$ and R0$y''$;
a third hybrid detector (35) that couples the components R1$y'$ and R0$x''$ and outputs electric signals that correspond to real and imaginary parts of Re, the Re being an interference signal of the components R1$y'$ and R0$x''$;
a fourth hybrid detector (37) that couples the components R1$y'$ and R0$y'$ and outputs electric signals that correspond to real and imaginary parts of Rf, the Rf being an interference signal of the components R1$y'$ and R0$y'$;
a signal processor (39) which receives the real and imaginary parts of Rc, Rd, Re and Rf and reconstructs complex signals Rx and Ry, the Rx and Ry corresponding to an information signal used to generate the input signal R1.

2. The self-homodyne detection (SHD) receiver in accordance with claim 1,
wherein the first hybrid detector (31) comprises a 90-degree hybrid 41, a first set of two photodetectors (43$a$) in a balanced configuration and a second set of two photodetectors (43$b$) in a balanced configuration,
wherein the 90-degree hybrid (41) comprises:
a first splitter (51), which divides R1$x'$ into two components R1$x'a$ and R1$x'b$;
a second splitter (53), which divides R0$x'$ into two components R0$x'a$ and R0$x'b$;
a 90 degree phase shifter (55), which shifts a phase of R1$x'a$ by 90 degrees to obtain a phase shifted signal R1$x'a'$;
a first 2×2 coupler (57), which combines the signal R0$x'a$ and the phase shifted signal R1$x'a'$ to generate optical signals R1$xa$ and R1$xb$, which are proportional to jR0$x'a$+j R1$x'a'$ and −R0$x'a$+R1$x'a'$, respectively; and
a second 2×2 coupler (59), which combines the signal R1$x'b$ and the signal R0$x'b$ to generate optical signals R0$xa$ and R0$xb$, which are proportional to j R1$x'b$−R0$x'b$ and −R1$x'b$+j R0$x'b$, respectively;
wherein the first set of two photodetectors 43$a$ detects the electrical signals R1$xa$ and R1$xb$ and outputs a first electrical signal Rcr, Rcr resulting from the difference between the instantaneous powers of the optical signals R1$xa$ and R1$xb$ and being proportional to the real part of R1$x'a$×R0$x'a$*;
wherein the second set of two photodetectors 43$b$ detects the signals R0$xa$ and R0$xb$ and outputs a second electrical signal Rci, Rci resulting from the difference between the instantaneous powers of the optical signals R0$xa$ and R0$xb$ and being proportional to the imaginary part of R1$x'b$×R0$x'b$*, and
wherein the Rcr is a real part of the Rc and the Rci is an imaginary part of Rc.

3. A self-homodyne detection (SHD) receiver comprising:
a first separator (61) which separates an input signal R1 in two same components R1$'$;
a second separator (63) which separates a pilot tone R0 in two same components R0$'$;
a 90-degree polarization rotator (65) which modifies polarization of the component R0$'$ by 90 degrees to obtain aligned component R0$''$;
a first hybrid detector (67) that couples the components R1$'$ and R0$'$ and outputs electric signals that correspond to real and imaginary parts of Ra, the Ra being an interference signal of the components R1$'$ and R0$'$;
a second hybrid detector (69) that couples the components R1$'$ and R0$''$ and outputs electric signals that correspond to real and imaginary parts of Rb, the Rb being an interference signal of the components R1$'$ and R0$''$; and
a signal processor (71) which receives the real and imaginary parts of Ra and Rb and reconstructs complex signals Rx and Ry, the Rx and Ry corresponding to an information signal used to generate the input signal R1.

4. A self-homodyne detection (SHD) receiver comprising:
a first separator (61) which separates an input signal R1 in two same components R1$'$;
a second separator (63) which separates a pilot tone R0 in two same components R0$'$;
a 90-degree polarization rotator (65$b$) which modifies polarization of the component R1$'$ by 90 degrees to obtain aligned component R1$''$;
a first hybrid detector (67$b$) that couples the components R1$'$ and R0$'$ and outputs electric signals that correspond to real and imaginary parts of Ra', the Ra' being an interference signal of the components R1' and R0';

a second hybrid detector (69b) that couples the components R1" and R0' and outputs electric signals that correspond to real and imaginary parts of Rb', the Rb' being an interference signal of the components R1" and R0'; and a signal processor (71b) which receives the real and imaginary parts of Ra' and Rb' and reconstructs complex signals Rx and Ry, the Rx and Ry corresponding to an information signal used to generate the input signal R1.

\* \* \* \* \*